(12) United States Patent  (10) Patent No.: US 8,500,318 B2
Fang et al.  (45) Date of Patent:  Aug. 6, 2013

(54) LIGHT GUIDE PLATE AND MANUFACTURING METHOD THEREOF

(75) Inventors: Lindong Fang, Guangdong (CN); Yicheng Kuo, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 435 days.

(21) Appl. No.: 12/996,872

(22) PCT Filed: Nov. 15, 2010

(86) PCT No.: PCT/CN2010/078756
§ 371 (c)(1),
(2), (4) Date: Dec. 8, 2010

(87) PCT Pub. No.: WO2012/012987
PCT Pub. Date: Feb. 2, 2012

(65) Prior Publication Data
US 2012/0026742 A1  Feb. 2, 2012

(30) Foreign Application Priority Data
Jul. 30, 2010 (CN) .......................... 2010 1 0245691

(51) Int. Cl.
*F21V 7/04* (2006.01)
(52) U.S. Cl.
USPC ............ 362/618; 264/1.24; 349/65; 362/619; 362/624; 362/625; 385/129

(58) Field of Classification Search
USPC .. 362/617–619, 623–625; 385/129; 264/1.24; 349/65
See application file for complete search history.

(56) References Cited

U.S. PATENT DOCUMENTS

| | | | |
|---|---|---|---|
| 7,543,973 B2 * | 6/2009 | Shimura | 362/619 |
| 7,991,257 B1 * | 8/2011 | Coleman | 385/129 |
| 2009/0129119 A1 * | 5/2009 | Lee et al. | 362/619 |
| 2010/0135041 A1 | 6/2010 | Niu | |

FOREIGN PATENT DOCUMENTS

| | | |
|---|---|---|
| CN | 1291247 C | 12/2006 |
| CN | 100363809 C | 1/2008 |
| CN | 100376962 C | 3/2008 |
| CN | 101598296 A | 12/2009 |
| JP | 2007152494 A | 6/2007 |
| KR | 20070029320 A | 3/2007 |

* cited by examiner

*Primary Examiner* — Stephen F Husar
(74) *Attorney, Agent, or Firm* — Harness, Dickey & Pierce, PLC

(57) ABSTRACT

The present invention provides a light guide plate and a manufacturing method thereof. The manufacturing method firstly forms a plurality of spherical recesses arranged at intervals on a light-emitting surface of a light guide plate body when the light guide plate body is formed by pressing, and then applies a diffuser particle with corresponding shape on a surface of each of the spherical recesses, so as to complete the manufacture of the light guide plate. When being mounted in a backlight module, the light guide plate benefits the backlight module of reducing the use of diffuser films, so as to reduce the thickness and weight of the backlight module.

20 Claims, 6 Drawing Sheets

LIGHT GUIDE PLATE AND MANUFACTURING METHOD THEREOF

FIELD OF THE INVENTION

The present invention relates to a light guide plate and a manufacturing method thereof, and more particularly to a light guide plate and a manufacturing method thereof that reduces the use of diffuser films in a backlight module when assembling the backlight module.

BACKGROUND OF THE INVENTION

A light guide plate belongs to assembling members of a backlight module and plays an important role therein. At present, a light-emitting surface of the light guide plate used in the backlight module is mainly a smooth flat structure. Therefore, the light guide plate only provides a light-guiding function, the light guiding process thereof is run by the dot reflection structures arranged on a bottom of the light guide plate that are corresponding to lights emitted into the light guide plate; after being reflected, the lights will emit out of the light-emitting surface of the light guide plate that is parallel to the arrangement surface of the dot reflection structures.

In order to provide further effects, some manufacturers develop a kind of light guide having diffusing effect. The practical methods may be described, as follows:

1. Combining a diffuser film with a light guide plate through hot stamping or transferring.
2. Coating diffuser particles directly on the light-emitting surface of the light guide plate.
3. Filling diffuser particles into the light guide plate.

However, foregoing method has practically encountered some problems during the manufacturing process. For example, a diffuser film or a diffuser-particle layer on the light guide plate made by the first and the second methods may be easily peeled off therefrom. The light guide plate made by the third method difficulty achieve an expected diffuser effect since the uniformity of the diffuser particles filled into the light guide plate is difficult to control.

In conclusion, whether for manufacturing difficulty or practicability of the light guide plates made by the foregoing methods, the manufacturing methods of the light guide plate with diffuser effect brought up by the industries have certain shortcomings existing therein.

Hence, it is necessary to provide a light guide plate and a manufacturing method thereof to overcome the problems existing in the conventional technology.

SUMMARY OF THE INVENTION

A primary object of the invention is to provide a manufacturing method of light guide plate which is firstly formed with a plurality of spherical recesses on a light guide plate body, and then correspondingly applied with a plurality of diffuser particles on the spherical recesses to form the light guide plate. The method effectively increases matte degree of the light guide plate that reaches matte degree of a traditional diffuser film, helps to simplify components of a backlight module and reduces the thickness and weight of the backlight module.

A secondary object of the present invention is to provide a light guide plate which is made by the foregoing manufacturing method and provides a matte degree reached by a traditional light guide plate with a diffuser film as well, so as to benefit simplification of components of a backlight module.

To achieve the above object, the present invention provides a manufacturing method of a light guide plate, characterized in that: the manufacturing method has steps of: firstly forming a light guide plate body, forming a plurality of spherical recesses arranged at intervals on a light-emitting surface of the light guide plate body, and finally applying a plurality of diffuser particles with corresponding shapes on surfaces of the spherical recesses.

Furthermore, the present invention provides a light guide plate having:

a light guide plate body having a light-emitting surface and a plurality of spherical recesses, wherein the spherical recesses are arranged at intervals on the light-emitting surface; and a plurality of diffuser particles mounted on surfaces of the spherical recesses, respectively, wherein the diffuser particles corresponds to the spherical recesses in shape and size.

In one embodiment of the present invention, the diffuser particles are mixed in a solution of adhesive and attached to the corresponding surfaces of the spherical recesses through the adhesive.

In one embodiment of the present invention, a means of forming the spherical recesses is using a mold to perform a pressing action for forming the spherical recesses on the light-emitting surface of the light guide plate body.

In one embodiment of the present invention, the mold is a hard film having a plurality of hemisphere protrusions, wherein the hard film is used with a pressing roller to roll on the light guide plate body, so that the spherical recesses are formed with the hard film along the light-emitting surface of the light guide plate body.

In one embodiment of the present invention, the mold is a soft film having a plurality of hemisphere protrusions on a surface thereof, wherein the soft film is rolled by several driving rollers and used with a pressing roller to roll over the light guide plate body, so that the spherical recesses are formed with the soft film along the light-emitting surface of the light guide plate body.

In one embodiment of the present invention, the diffuser particles are partially protruded out from the corresponding spherical recesses.

In one embodiment of the present invention, the diffuser particles includes a plurality of smaller particles and a plurality of larger particles, wherein the smaller particles are arranged into a plurality of first rows, the larger particles are arranged into a plurality of second rows, wherein the first rows and the second rows are arranged alternately side by side.

In one embodiment of the present invention, material of the light guide plate body is selected from poly(methyl methacrylate) (PMMA); material of the diffuser particles is selected from magnesium fluoride ($MgF_2$).

In one embodiment of the present invention, material of the light guide plate body is selected from polycarbonate (PC); material of the diffuser particles is selected from poly(methyl methacrylate) (PMMA).

Comparing with the existing techniques, the manufacturing method of the light guide plate effectively increases matte degree of the light guide plate, so as to not only reduces the use of diffuser films, but also effectively reduces thickness and weight of the backlight module while processing manufacturing of a backlight module.

DETAILED DESCRIPTION OF THE PREFERRED EMBODIMENTS

The foregoing objects, features and advantages adopted by the present invention can be best understood by referring to the following detailed description of the preferred embodiments and the accompanying drawings.

Figure 1:
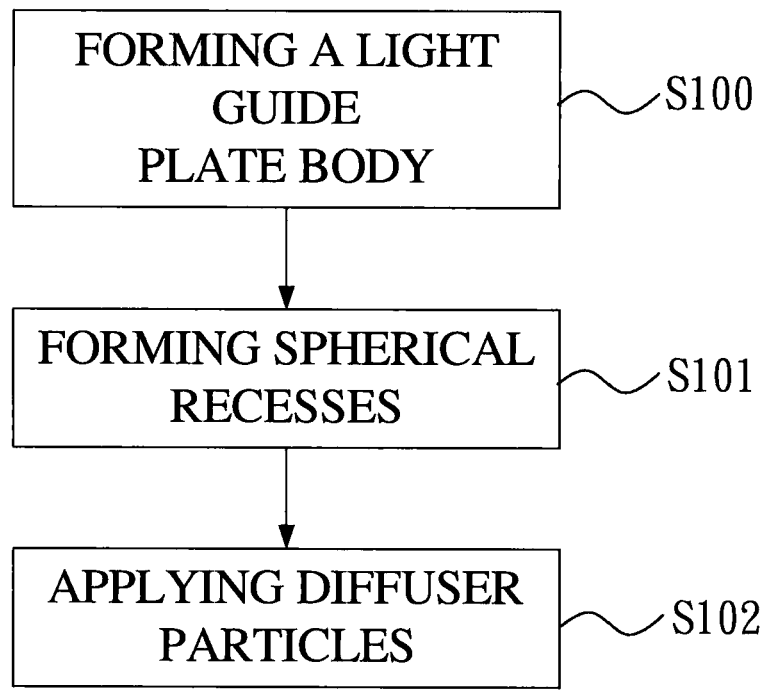
FIG. 1 is a flow chart of a manufacturing method of a light guide plate according to a preferred embodiment of the present invention.

With reference to FIG. 1, FIG. 1 discloses a manufacturing method of a light guide plate according to a preferred embodiment of the present invention. The manufacturing method comprises a step S100 of forming a light guide plate body, a step S101 of forming spherical recesses and a step S102 of applying diffuser particles.

Figure 2:
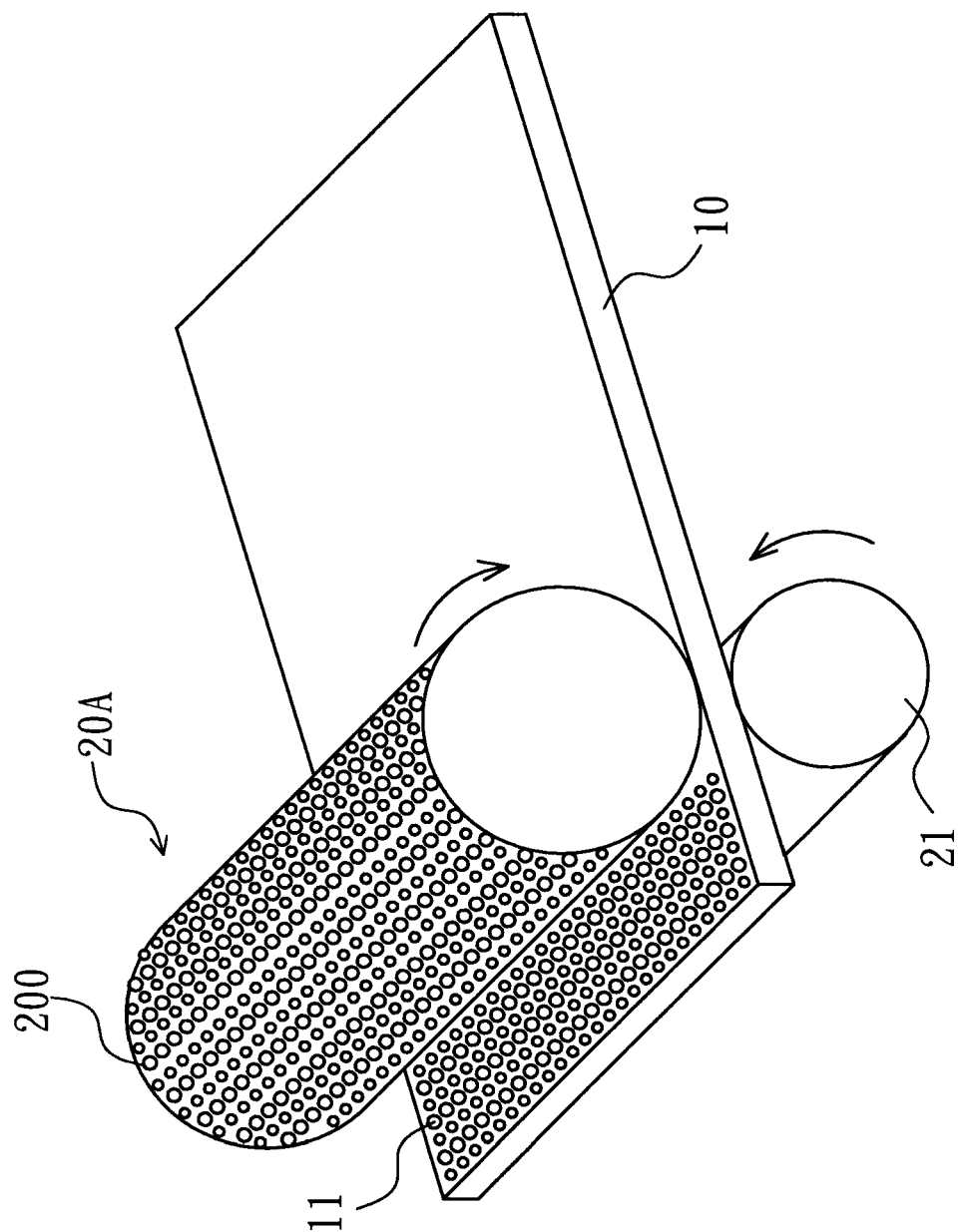
FIG. 2 is an operational view of a step of forming spherical recesses according to a first embodiment of the present invention.

Also referring to FIG. 2, FIG. 2 discloses an operational view of the step S101 of forming spherical recesses according to a first embodiment of the present invention. The step S100 of forming a light guide plate body is using a means of pressing to form a light guide plate body 10. The material of the light guide plate body 10 may be selected from thermoplastics, such as poly(methyl methacrylate) (PMMA), polycarbonate (PC), and etc.

The step S101 of forming spherical recesses is forming a plurality of spherical recesses 11 at intervals on a light-emitting surface of the light guide plate body 10. In detail, the step 101 is forming the spherical recesses 11 on the light-emitting surface of the light guide plate body 10 when the light guide plate body 10 is not completely dried to be solid just after pressing. In the embodiment, a means of forming the spherical recesses 11 is using a mold to perform a pressing action for forming the spherical recesses 11 on the light-emitting surface of the light guide plate body 10. The mold may be a hard film 20A, which is preferably in a transferring-roller type (as shown in FIG. 2). The hard film has a plurality of hemisphere protrusions 200 mounted on a surface thereof. The hard film 20A may be used with a pressing roller 21 to roll on the light guide plate body 10, so that the spherical recesses 11 are formed with the hard film 20A along the light-emitting surface of the light guide plate body 10.

Figure 3:
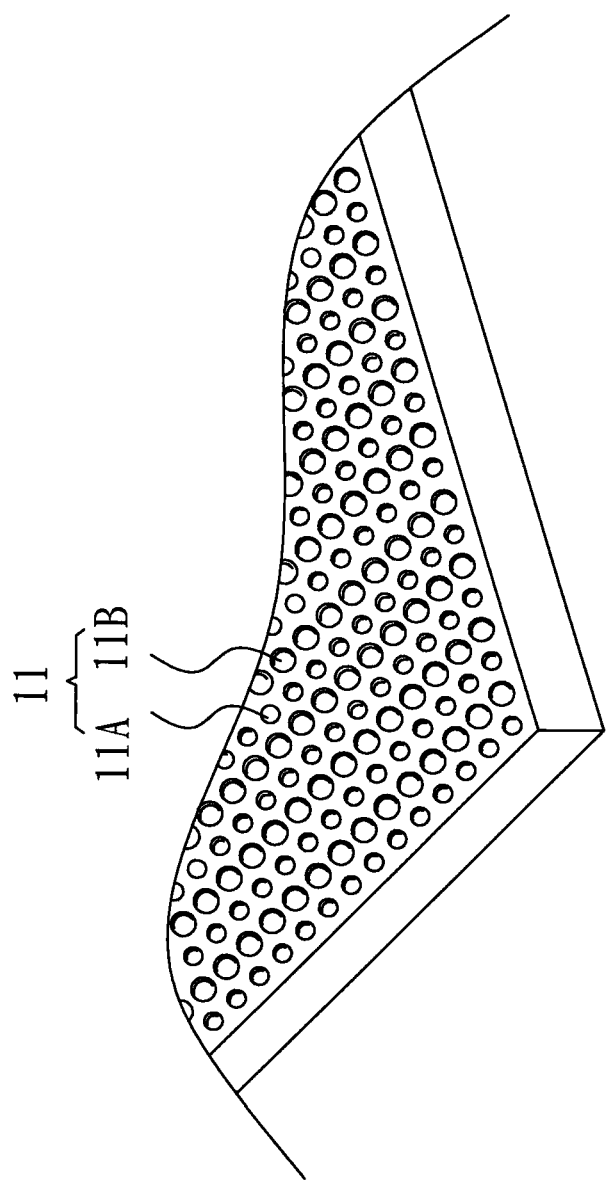
FIG. 3 is a partially enlarged schematic view of a light guide plate body after the step of forming spherical recess in FIG. 2.

With further reference to FIG. 3, FIG. 3 is a partially enlarged schematic view of the light guide plate body 10 after forming the spherical recesses 10 on the light-emitting surface of the light guide plate body 10. The spherical recesses 11 may be a plurality of smaller recesses 11A and a plurality of larger recesses 11B, wherein the smaller recesses 11A and the larger recesses 11B are arranged side by side at intervals with each other. Besides, in other embodiments, the recesses with three or more than three kinds of diameter may be implemented in the present invention.

Figure 4:
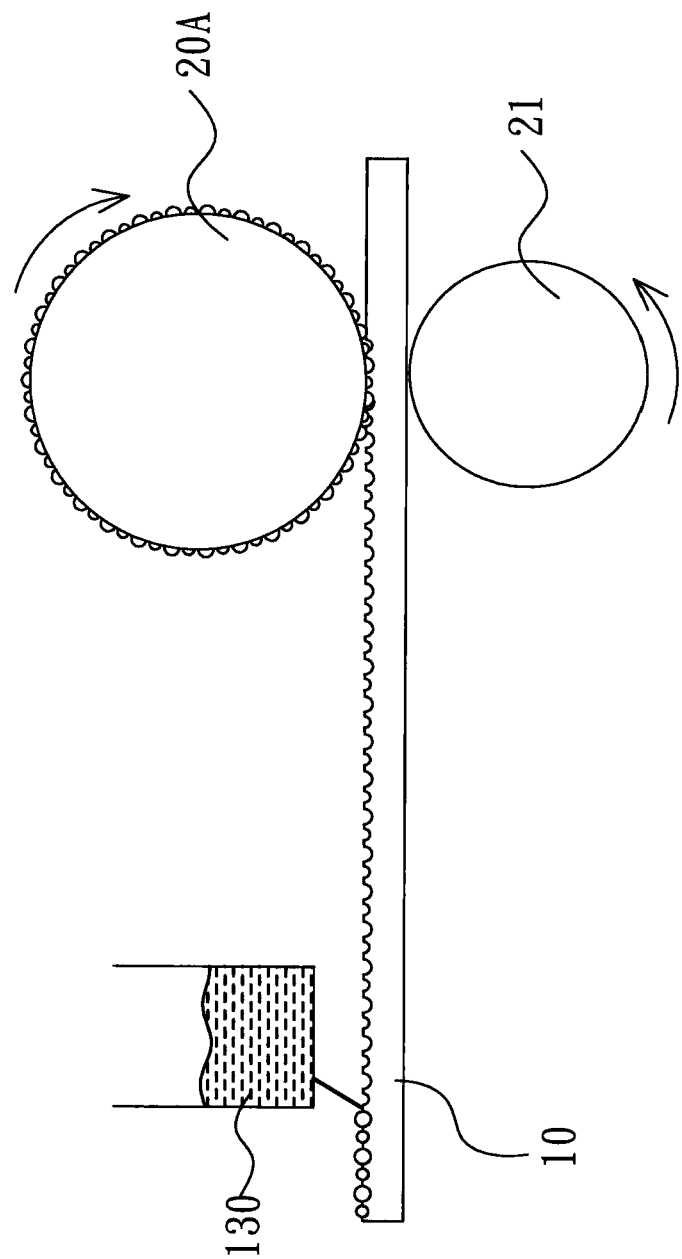
FIG. 4 is an operational view of a step of applying diffuser particles according to the first embodiment of the present invention.
Figure 5:
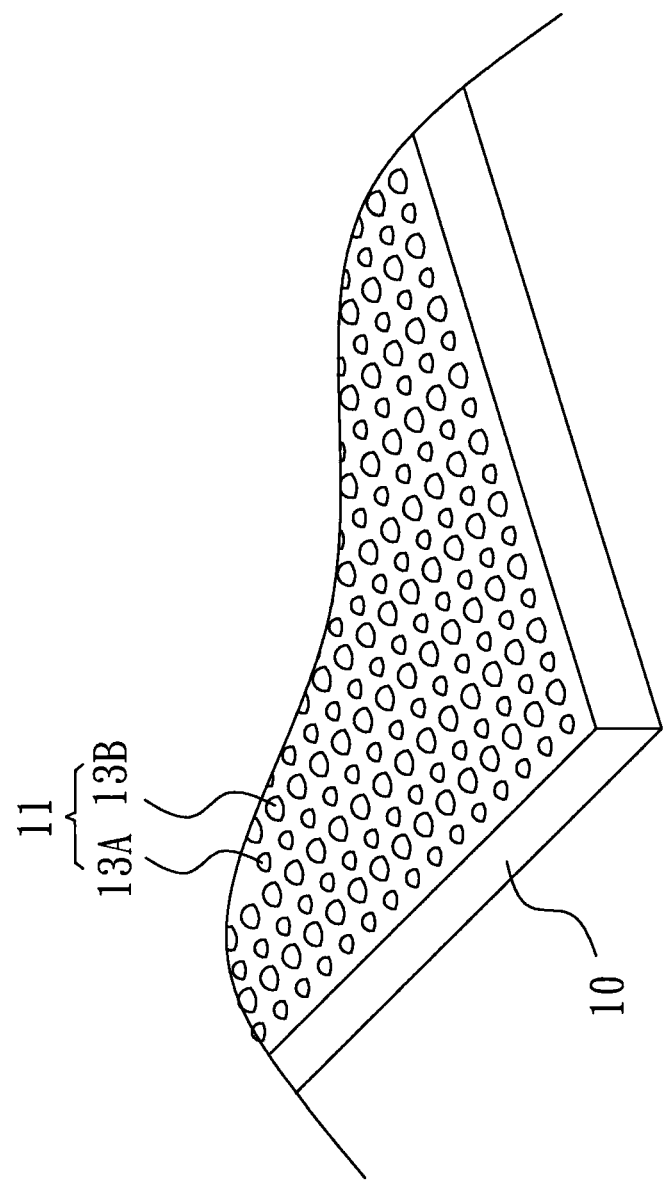
FIG. 5 is a partially enlarged schematic view of a light guide plate body after the step of applying diffuser particles in FIG. 4.

With further reference to FIGS. 4 and 5, FIG. 4 is an operational view of the step S102 of applying the diffuser particles according to a first embodiment of the present invention, and FIG. 5 is a partially enlarged schematic view of the light guide plate body 10 after forming the diffuser particles 13 on the light-emitting surface of the light guide plate body 10. The step S102 of applying diffuser particles is to process each of the spherical recesses 11 to be applied with a shape-corresponding diffuser particle 13. In detail, the step S102 is placing a container 30 filled with solution 130 having diffuser particles 13 above the spherical recesses 11 which are just formed, and applies the solution 130 in the container 30 onto the surfaces of each of the spherical recesses 11. After being dried, the diffuser particles 13 then are attached to the surfaces of the spherical recesses 11. In more detail, the solution is preferably a solution of adhesive, and the diffuser particles 13 are attached to corresponding surfaces of the spherical recesses 11 through the adhesive by brush applying. Material of the diffuser particles 13 may be selected from magnesium fluoride ($MgF_2$) or poly(methyl methacrylate) (PMMA). Preferably when the material of the light guide plate body 10 is poly(methyl methacrylate) (PMMA), the material of the diffuser particles 13 is magnesium fluoride ($MgF_2$); when the material of the light guide plate body 10 is polycarbonate (PC), the material of the diffuser particles 13 is poly(methyl methacrylate) (PMMA). Foregoing selection of materials is to differ the material of the diffuser particles 13 from the material of the light guide plate body 10, so as to use the difference in material to provide different refraction index for guiding the lights to pass through and thus perform diffusing effect.

With reference to FIG. 5, the diffuser particles 13 includes a plurality of smaller particles 13A and a plurality of larger particles 13B, wherein the smaller particles 13A are arranged into a plurality of first rows, the larger particles 13B are arranged into a plurality of second rows, wherein the first rows and the second rows are arranged alternately side by side. Besides, in other embodiments, the number of the rows of the diffuser particles may correspond to the recesses in three or more than three kinds of diameter in the present invention.

Figure 6:
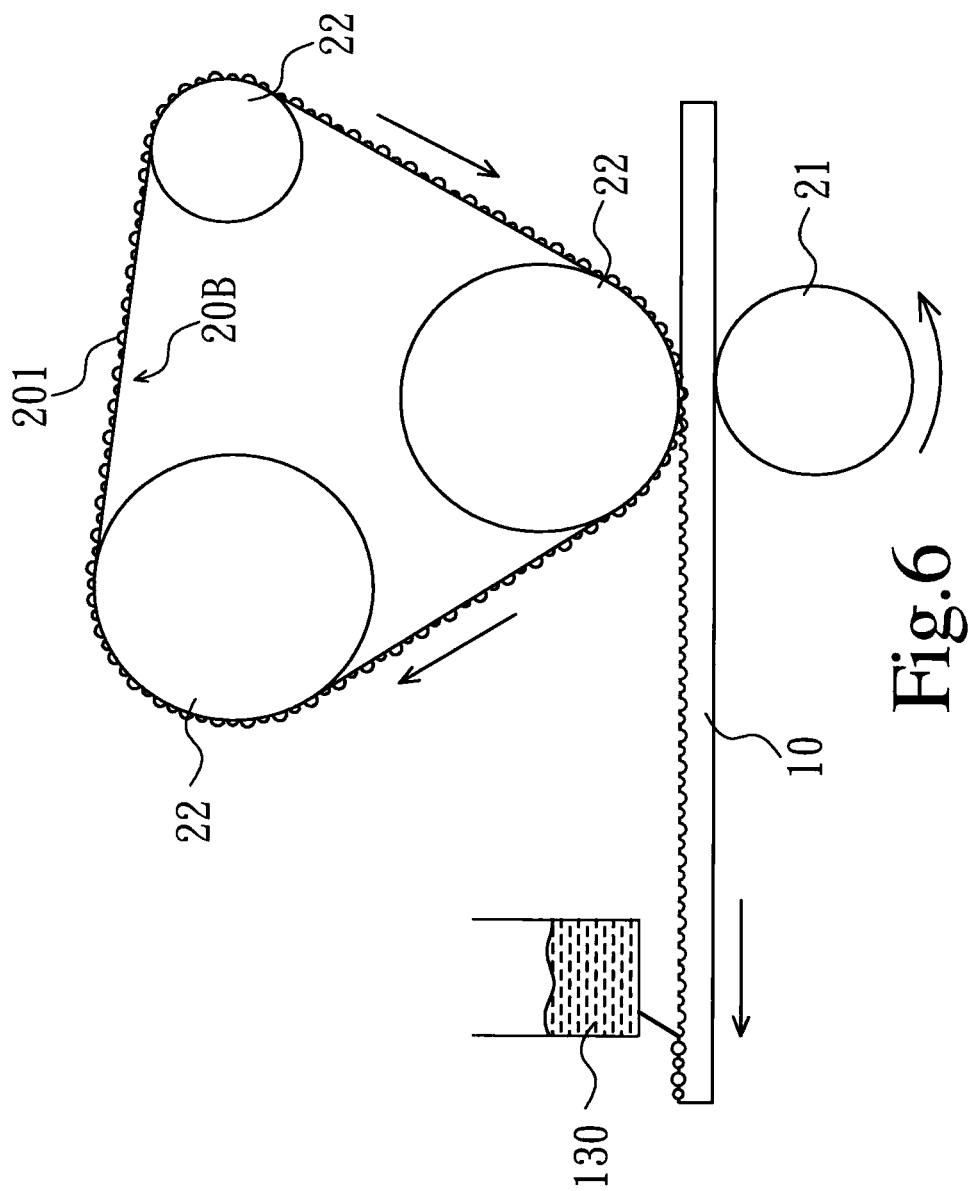
FIG. 6 is an operational view of a step of forming spherical recesses according to a second embodiment of the present invention.

With reference to FIG. 6, FIG. 6 is an operational schematic view of the step S101 of forming spherical recesses according to a second embodiment of the present invention. The step of forming spherical recesses according to the second embodiment of the present invention is similar to the first embodiment of the present invention, so as to use similar terms and numerals of the first embodiment. But, the difference of the second embodiment is that: the mold is a soft film 20B, wherein the soft film 20B is preferably in a transferring type, and has a plurality of hemisphere protrusions 201 on a surface thereof, and wherein the soft film is preferably rolled by several driving rollers 22 and is used with a pressing roller 21 to roll over the light guide plate body 10, so that the spherical recesses 11 are formed with the soft film 20B along the light-emitting surface of the light guide plate body 10.

In conclusion, a finished product of the light guide plate made by the manufacturing method of the present invention has the light guide plate body 10 and the diffuser particles 13, wherein the light guide plate body 10 has a plurality of spherical recesses 11 arranged at intervals on the light-emitting surface of the light guide plate body 10; and the diffuser particles 13 are correspondingly mounted on the surfaces of the spherical recesses 11 that each of the diffuser particles 13 corresponds to the corresponding spherical recesses 11 in shape and size. In more detail, the diffuser particles 13 are partially protruded out from the corresponding spherical recesses 11.

Comparing with conventional manufacturing method of light guide plate which has shortcomings that the diffuser film or diffuser particles easily separate from the light guide plate or the uniformity of the diffuser particles filled in the light guide plate is hard to control, the manufacturing method of the present invention in FIG. 1 firstly forms the spherical recesses 11 on the light-emitting surface of the light guide plate body 10, then correspondingly mounts the diffuser particles 13 on the spherical recesses 11 to form the light guide plate, which effectively increase matte degree of the light guide plate that can achieve the matte effect reached by a conventional light guide plate stacked with a diffuser film as well, so as to reduce the use of diffuser films and reduce the thickness and weight of the backlight module after assembling.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A manufacturing method of a light guide plate, characterized in that: comprises steps of:
    forming a light guide plate body;
    forming a plurality of spherical recesses at intervals on a light-emitting surface of the light guide plate body, wherein means of forming the spherical recesses is using a mold to perform a pressing action for forming the spherical recesses on the light-emitting surface of the light guide plate body; and
    applying a plurality of diffuser particles with corresponding shapes on the surface of each of the spherical recesses, wherein the diffuser particles are mixed in a solution of adhesive and attached to corresponding surfaces of the spherical recesses through the adhesive.

2. The manufacturing method of a light guide plate as claimed in claim 1, characterized in that: the mold is a hard film having a plurality of hemisphere protrusions, wherein the hard film is used with a pressing roller to roll on the light guide plate body, so that the spherical recesses are formed with the hard film along the light-emitting surface of the light guide plate body.

3. The manufacturing method of a light guide plate as claimed in claim 1, characterized in that: the mold is a soft film having a plurality of hemisphere protrusions on a surface thereof, wherein the soft film is rolled by driving rollers and used with a pressing roller to roll over the light guide plate body, so that the spherical recesses are formed with the soft film along the light-emitting surface of the light guide plate body.

4. A manufacturing method of a light guide plate, characterized in that: comprises steps of:
    forming a light guide plate body;
    forming a plurality of spherical recesses arranged at intervals on a light-emitting surface of the light guide plate body; and
    applying a plurality of diffuser particles with corresponding shapes on the surfaces of the spherical recesses.

5. The manufacturing method of a light guide plate as claimed in claim 4, characterized in that: the diffuser particles are mixed in a solution of adhesive and attached to the corresponding surfaces of the spherical recesses through the adhesive.

6. The manufacturing method of a light guide plate as claimed in claim 4, characterized in that: means of forming the spherical recesses is using a mold to perform a pressing action for forming the spherical recesses on the light-emitting surface of the light guide plate body.

7. The manufacturing method of a light guide plate as claimed in claim 6, characterized in that: the mold is a hard film having a plurality of hemisphere protrusions, wherein the hard film is used with a pressing roller to roll on the light guide plate body, so that the spherical recesses are formed with the hard film along the light-emitting surface of the light guide plate body.

8. The manufacturing method of a light guide plate as claimed in claim 6, characterized in that: the mold is a soft film having a plurality of hemisphere protrusions on a surface thereof, wherein the soft film is rolled by driving rollers and used with a pressing roller to roll over the light guide plate body, so that the spherical recesses are formed with the soft film along the light-emitting surface of the light guide plate body.

9. A light guide plate, characterized in that: the light guide plate comprises:
    a light guide plate body having a light-emitting surface and a plurality of spherical recesses, wherein the spherical recesses are arranged at intervals on the light-emitting surface; and
    a plurality of diffuser particles mounted on surfaces of the spherical recesses, respectively, wherein the diffuser particles corresponds to the spherical recesses in shape and size.

10. The light guide plate as claimed in claim 9, characterized in that: the diffuser particles are partially protruded out from the corresponding spherical recesses.

11. The light guide plate as claimed in claim 9, characterized in that: the diffuser particles includes a plurality of smaller particles and a plurality of larger particles, wherein the smaller particles are arranged into a plurality of first rows, the larger particles are arranged into a plurality of second rows, wherein the first rows and the second rows are arranged alternately side by side.

12. The light guide plate as claimed in claim 10, characterized in that: the diffuser particles includes a plurality of smaller particles and a plurality of larger particles, wherein the smaller particles are arranged into a plurality of first rows, the larger particles are arranged into a plurality of second rows, wherein the first rows and the second rows are arranged alternately side by side.

13. The light guide plate as claimed in claim 9, characterized in that: material of the light guide plate body is selected from poly(methyl methacrylate); material of the diffuser particles is selected from magnesium fluoride.

14. The light guide plate as claimed in claim 10, characterized in that: material of the light guide plate body is selected from poly(methyl methacrylate); material of the diffuser particles is selected from magnesium fluoride.

15. The light guide plate as claimed in claim 11, characterized in that: material of the light guide plate body is selected from poly(methyl methacrylate); material of the diffuser particles is selected from magnesium fluoride.

16. The light guide plate as claimed in claim 12, characterized in that: material of the light guide plate body is selected from poly(methyl methacrylate); material of the diffuser particles is selected from magnesium fluoride.

17. The light guide plate as claimed in claim 9, characterized in that: material of the light guide plate body is selected from polycarbonate; material of the diffuser particles is selected from poly(methyl methacrylate).

18. The light guide plate as claimed in claim 10, characterized in that: material of the light guide plate body is selected from polycarbonate; material of the diffuser particles is selected from poly(methyl methacrylate).

19. The light guide plate as claimed in claim 11, characterized in that: material of the light guide plate body is selected from polycarbonate; material of the diffuser particles is selected from poly(methyl methacrylate).

20. The light guide plate as claimed in claim 12, characterized in that: material of the light guide plate body is selected from polycarbonate; material of the diffuser particles is selected from poly(methyl methacrylate).

* * * * *